(12) United States Patent
Agnew

(10) Patent No.: US 7,377,111 B2
(45) Date of Patent: May 27, 2008

(54) CARBON DIOXIDE RECIRCULATION

(75) Inventor: Gerard D Agnew, Derby (GB)

(73) Assignee: Rolls-Royce plc, London (GB)

( * ) Notice: Subject to any disclaimer, the term of this patent is extended or adjusted under 35 U.S.C. 154(b) by 699 days.

(21) Appl. No.: 10/829,433

(22) Filed: Apr. 22, 2004

(65) Prior Publication Data

US 2004/0224210 A1 Nov. 11, 2004

(30) Foreign Application Priority Data

May 8, 2003 (GB) ................................. 0310632.5

(51) Int. Cl.
*F02C 3/34* (2006.01)
(52) U.S. Cl. .......................................... 60/772; 60/752
(58) Field of Classification Search ............... 60/39.52, 60/772, 783, 784, 801
See application file for complete search history.

(56) References Cited

U.S. PATENT DOCUMENTS 4,498,289 A * 2/1985 Osgerby ................... 60/39.52

6,225,706 B1 * 5/2001 Keller ........................ 290/54
2002/0134085 A1 * 9/2002 Frutschi ...................... 60/772

FOREIGN PATENT DOCUMENTS

| JP | 11241618 A | 2/1998 |
| JP | 2000265805 A | 3/1999 |
| JP | 2000337108 A | 5/1999 |
| WO | WO 046341 A | 6/2003 |

* cited by examiner

*Primary Examiner*—L. J. Casaregola
(74) *Attorney, Agent, or Firm*—W. Warren Taltavull; Manelli Denison & Selter PLLC

(57) ABSTRACT

Carbon dioxide recirculating apparatus (20, 120) is disclosed for use in an arrangement having combination means (115) and a path for the flow of a gas through the combustion means (115). The apparatus (20, 120) comprises extraction means (221) for extracting carbon dioxide from a first region of the path downstream of the combustion means (115). It further includes condensing means (26, 30) for condensing the extracted carbon dioxide, and feed means (36, 136) for feeding the condensed carbon dioxide to a second region of the path upstream of the combustion means.

8 Claims, 4 Drawing Sheets

CARBON DIOXIDE RECIRCULATION

FIELD OF THE INVENTION

This invention relates to carbon dioxide recirculating apparatus. More particularly, the invention relates to carbon dioxide recirculating apparatus for heat engines, for example gas turbine engines, or fuel cells.

BACKGROUND OF THE INVENTION

It is known to inject a water based fog into the compressor region of a gas turbine engine to increase the power of the engine. The water is atomised when it is sprayed into the compressor region and forms a fog. The water droplets forming the fog vaporise and extract latent heat of evaporation from the gases in the compressor, thereby cooling these gases. This has a beneficial affect on the power output of the engine. A disadvantage of such a system is that evaporation of the water droplets is not readily achieved and requires onerous nozzle and spray pressure specifications to achieve the required cooling effect.

SUMMARY OF THE INVENTION

According to one aspect of this invention, there is provided carbon dioxide recirculating apparatus for an arrangement comprising combustion means and a path for a flow of gas through the combustion means, the apparatus comprising extraction means for extracting gaseous carbon dioxide from a region of the path downstream of the combustion means, condensing means for condensing the extracted carbon dioxide, and feed means for feeding the condensed carbon dioxide to a region of the path upstream of the combustion means.

The arrangement preferably comprises a heat engine or a fuel cell.

The preferred embodiment of the invention is particularly suitable for use in an arrangement in the form of a gas turbine engine. In this embodiment, the feed means may feed the condensed carbon dioxide to a compressor region of the gas turbine engine. The extraction means may be arrangeable downstream of a turbine arrangement of the gas turbine engine.

According to another aspect of this invention there is provided an arrangement comprising combustion means a path for the flow of gas through the combustion means and carbon dioxide recirculating apparatus comprising extraction means for extracting gaseous carbon dioxide from a first region of the path downstream of the combustion means, condensing means for condensing the extracted carbon dioxide, and feed means for feeding the condensed carbon dioxide to a second region of the path upstream of the combustion means.

The arrangement may comprise a heat engine or a fuel cell assembly. The heat engine may be a gas-turbine having a compressor region in the path of the gas upstream of the combustion means, and a turbine region in the path of the gas downstream of the combustion means. The compressor means may be a compressor unit.

The condensing means may comprise heat removal means to remove heat from the extracted carbon dioxide. The condensing means may include compressor means to compress the extracted carbon dioxide. Preferably, the compressor means is arranged between the extraction means and the heat removal means. In the preferred embodiment, the heat removal means comprises cooling means to cool the carbon dioxide.

The feed means may comprise spray means to spray the condensed carbon dioxide into the second region. Where the arrangement comprises a gas turbine engine, the spray means may spray the condensed carbon dioxide into the compressor region of the gas turbine engine, preferably to form a fog of the carbon dioxide. The spray means may comprise atomising means, which may be in the form of a nozzle. Preferably, the atomising means comprises a plurality of atomising nozzles, which may be in the form of an array of nozzles.

The extraction means may comprise a recirculating amine based extraction means, and may include cooling and heating units to support the operation of the amine based extraction means.

Preferably, the extraction means is arrangeable to extract carbon dioxide from the exhaust gases downstream of the turbine region.

The compressor region of the engine may comprise first and second compressors, and the feed means may be arrangeable to feed condensed carbon dioxide to the compressor region between the first and second compressors. Alternatively, or in addition, the feed means may feed the condensed carbon dioxide to the compressor region at an outlet of the compressor region. Alternatively, or in addition, the feed means may be arrangeable to feed the carbon dioxide at an inlet to the compressor region.

In one embodiment, the feed means may be arrangeable to feed the condensed carbon dioxide to the outlet of the compressor region, whereby the carbon dioxide thereafter passes into a heat exchanger to exchange heat with gases exiting from the turbine region of the gas turbine engine. Preferably, the heat exchanger comprises a recuperator.

The fuel cell assembly may be arranged to receive carbon dioxide from the carbon dioxide recirculating apparatus. The fuel cell assembly may comprise an anode and a cathode. Preferably exhaust from the anode is passed to the carbon dioxide recirculating apparatus.

The fuel cell assembly may comprise a compressor for compressing air and other gases to be supplied to the cathode. The fuel cell assembly may comprise a conduit for directing recirculated carbon dioxide to the anode. Alternatively, or in addition, the fuel cell assembly may comprise a conduit for directing carbon dioxide to the compressor for mixing with air compressed by the compressor. The compressor may be a compressor of the compressor region of the gas turbine engine.

According to another aspect of this invention, there is provided a method of recirculating carbon dioxide from a flow of gas through an arrangement comprising combustion means and a path for the flow of gas through the combustion means, the method comprising extracting carbon dioxide from a first region downstream of the combustion means, condensing the extracted carbon dioxide and thereafter feeding the condensed carbon dioxide to a second region upstream of the combustion means.

Preferably the step of condensing the extracted carbon dioxide comprises providing heat removal means to remove heat from the carbon dioxide and may also include compressing the carbon dioxide prior to removing said heat from the carbon dioxide.

The heat removal means may comprise cooling means to cool the carbon dioxide to effect said condensation thereof.

The step of feeding the condensed carbon dioxide to the second region of the engine may comprise spraying the condensed carbon dioxide to the second region. The spraying of the condensed carbon dioxide may form a fog of the carbon dioxide in the upstream region of the engine.

Preferably the step of feeding the carbon dioxide to the second region of the engine comprises atomising the condensed carbon dioxide.

In the preferred embodiment, the engine is a gas turbine engine comprising a compressor region upstream of the combustion means and a turbine region downstream of the combustion means, and the step of extracting carbon dioxide comprises extracting carbon dioxide downstream of the turbine region of the engine.

In the preferred embodiment, the step of feeding the carbon dioxide to the second region of the path comprises feeding the carbon dioxide to the compressor region of the engine. The compressor region may comprise first and second compressors arranged in axial flow series in the path and the step of feeding the carbon dioxide to the compressor region may comprise feeding the carbon dioxide between the first and second compressors and/or to an outlet of the compressor region and/or to an inlet of the compressor region.

The engine may comprise heat exchange means to exchange heat between gas entering the combustion means and gas exhausted from the combustion means, preferably downstream of the turbine region. The step of feeding the condensed carbon dioxide to the second region may comprise feeding the carbon dioxide to gas entering the heat exchange means upstream of the combustion means preferably at the outlet of the compressor region. The heat exchange means may comprise a recuperator.

BRIEF DESCRIPTION OF THE DRAWINGS

Embodiments of the invention will now be described by way of example only with reference to the accompanying drawings in which.

DETAILED DESCRIPTION OF THE INVENTION

Figure 1:
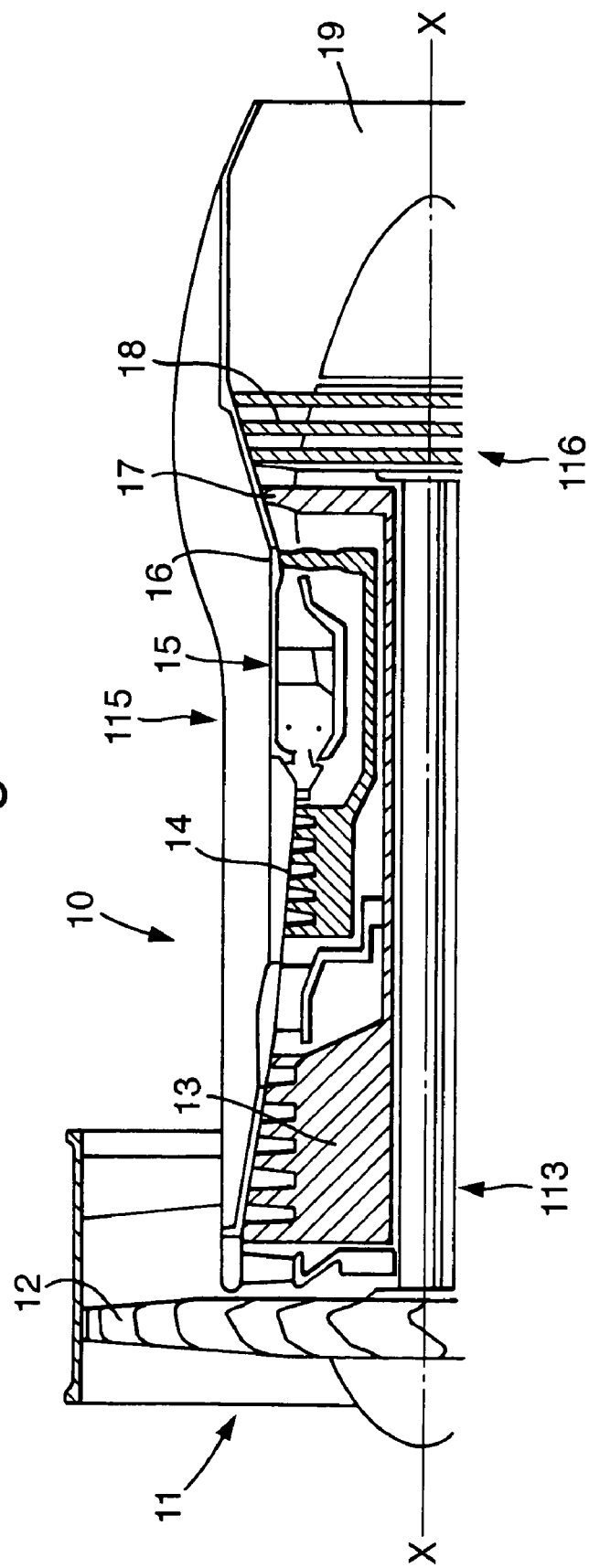
FIG. 1 shows a sectional view of the upper half of a gas turbine engine.

With reference to FIG. 1, a ducted fan gas turbine engine generally indicated at 10 has a principal axis X-X. The engine 10 comprises, in axial flow series, an air intake 11, a propulsive fan 12, a compressor region 113 comprising an intermediate pressure compressor 13, and a high pressure compressor 14, combustion means 115 comprising a combustor 15, and a turbine region 116 comprising a high pressure turbine 16, an intermediate pressure turbine 17, and a low pressure turbine 18. An exhaust nozzle 19 is provided at the tail of the engine 10.

The gas turbine engine 10 works in the conventional manner so that air entering the intake 11 is accelerated by the fan to produce two air flows: a first air flow into the intermediate pressure compressor 13 and a second air flow which provides propulsive thrust. The intermediate pressure compressor 13 compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbine 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

Figure 2:
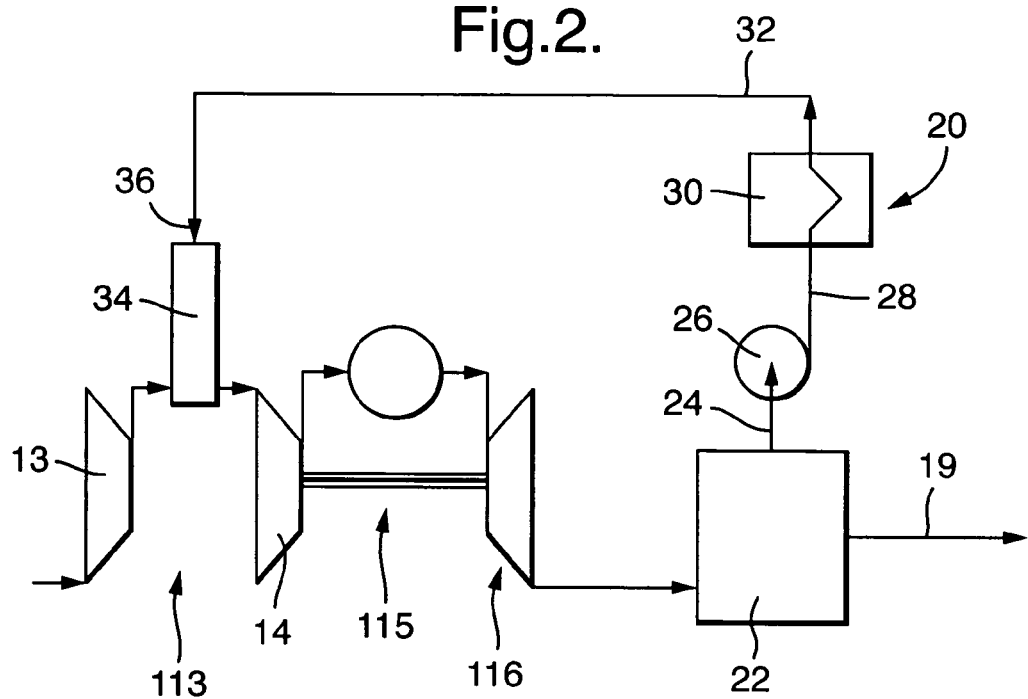
FIG. 2 is a diagrammatic representation of carbon dioxide recirculating apparatus.

Referring to FIG. 2, there is shown a schematic representation of carbon dioxide recirculating apparatus 20 for use in a gas turbine engine. FIG. 2 shows the compressor region 113, the combustion region 115, and the turbine region 116, of the engine 10 as described above. FIG. 2 also shows the carbon dioxide recirculating apparatus 20 comprising extraction means 22 arranged downstream of the turbine region 116 in the main flow of gas to be exhausted from the engine 10. The extraction means 22 may comprise any suitable known carbon dioxide extraction arrangement. An example of such an arrangement is a recirculating amine based unit in which amine solvents such as diethandamine can be employed to remove the carbon dioxide to remove carbon dioxide from the gas in the main flow downstream of the turbine region 116. Carbon dioxide extracted from the exhaust gases is passed via a line 24 to compressor means in the form of a carbon dioxide compressor unit 26. The resulting carbon dioxide depleted exhaust is passed to the exhaust nozzle 19.

The compressor unit 26 compresses the extracted carbon dioxide, which is passed via a line 28 to a cooler 30 which condenses the compressed carbon dioxide, and produces pressurized liquid carbon dioxide at or near ambient temperature. The pressurized liquid carbon dioxide is then passed via a line 32 to feed means in the form of a feed nozzle arrangement 36. The pressurized liquid carbon dioxide is fed by the nozzle arrangement 36 to the compressor region 113 of the gas turbine engine 10. Specifically, the liquid carbon dioxide is fed to the main duct designated 34 (shown schematically in FIG. 2) between the intermediate pressure compressor 13 and the high pressure compressor 14.

The feed nozzle arrangement 36 comprises an array of atomising nozzles to spray the liquid carbon dioxide into the main duct 34 between the intermediate and high pressure compressors 13, 14.

As the liquid carbon dioxide is atomised into the duct 34, it partly flashes to the vapour phase. Carbon dioxide which does not vaporise partly solidifies. This results in a mixture of solid, liquid and gaseous carbon dioxide. The solid carbon dioxide then sublimes to the vapour phase, and the remaining liquid carbon dioxide then vaporises to the vapour phase. This results in a carbon dioxide fog forming in the duct 34. The sublimation and vaporisation of the carbon dioxide absorbs latent heat of sublimation and vaporisation from the gases in the duct 34 thereby cooling these gases.

Figure 3:
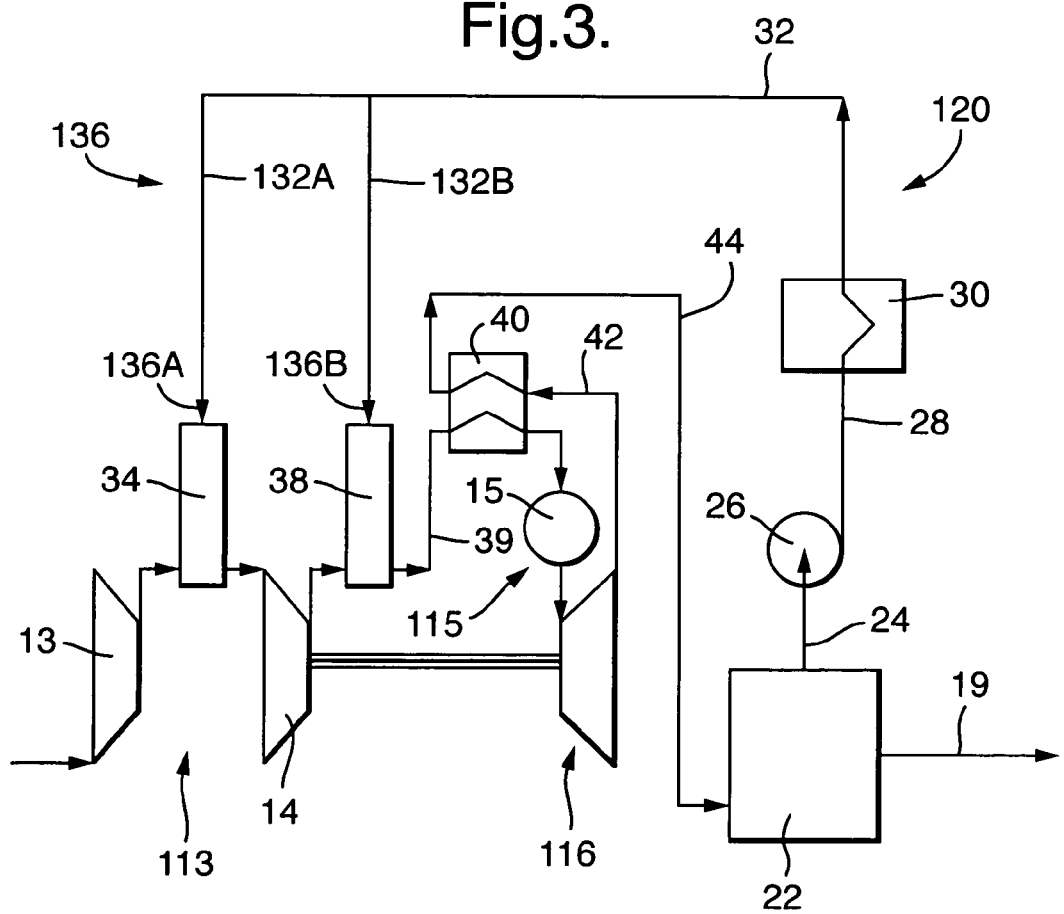
FIG. 3 is a further diagrammatic representation showing another embodiment of carbon dioxide recirculating apparatus.

FIG. 3 shows a further embodiment, which has many of the features of FIG. 2, and these features have been designated with the same reference numeral. In FIG. 3, the carbon dioxide recirculating apparatus is designated 120 and the feed means is designated 136 and comprises a first feed nozzle arrangement 136A and a second feed nozzle arrangement 136B.

The line 32 carrying the pressurised liquid carbon dioxide at ambient temperature splits into a first line 132A leading to the first feed nozzle arrangement 136A and a second line 132B leading to the second feed nozzle arrangement 136B. The first feed nozzle arrangement 136A atomises the liquid carbon dioxide so that it is sprayed into the duct 34 between the intermediate and high pressure compressors 13, 14. This spraying of the carbon dioxide has the same effects upon it as described above, with reference to the spraying of the carbon dioxide into the duct 34 in FIG. 2. The second feed nozzle arrangement sprays the liquid carbon dioxide into a duct 38 downstream of the high pressure compressor 14, and upstream of the combustor region 115. Again the carbon dioxide sprayed into the duct 38 undergoes the same phase changes as described above.

Thus, the pressurised liquid carbon dioxide sprayed into the ducts 34 and 38 via the respective arrays of nozzles 136A and 136B form a carbon dioxide fog in the ducts 34 and 38.

A heat exchanger in the form of a recuperator 40 is provided in the embodiment shown in FIG. 3, to exchange heat between gases exiting the compressor region 113 and the gases exiting the turbine region 116. The carbon dioxide fed by the second feed nozzle arrangement 136B into the main flow of gas in the duct 38 flashes to the vapour phase, solidifies, sublimes and vaporises in the same way as described above with reference to FIG. 2. The carbon dioxide, along with other gases in the duct 38 is passed, as indicated by the arrow 39, to one side of a recuperator 40 to exchange heat with exhaust gases from the turbine region 116 passed to the other side of the recuperator 40 as indicated by the arrow 42. The recuperator 40 is provided to increase the heat in the gases entering the combustor 15, which also has the effect of cooling the gases exiting from the turbine region 116 upstream of the extraction means 22.

The exhaust gases from the turbine region 116 exit the recuperator 40 and are then passed to the carbon dioxide extraction means 22 via the main duct, as indicated by the arrow 44.

Figure 4:
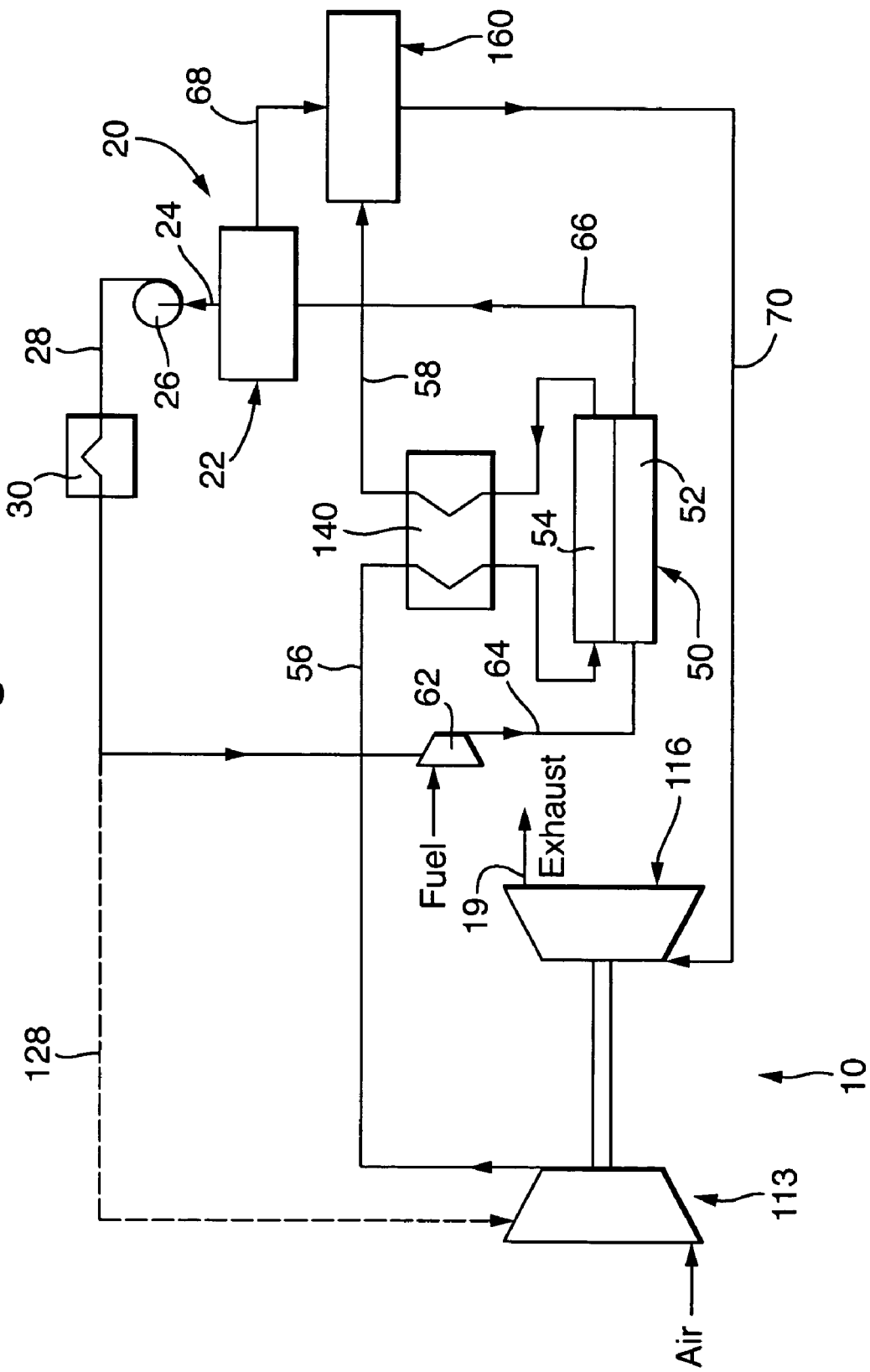
FIG. 4 is diagrammatic representation of a further embodiment of carbon dioxide recirculating apparatus incorporating fuel cell.

FIG. 4 is a diagrammatic representation of carbon dioxide recirculating apparatus 20 incorporating a fuel cell 50. The carbon dioxide recirculating apparatus 20 in FIG. 4 is shown in use in a gas turbine engine 10. The features of the gas turbine engine 10 and the carbon dioxide recirculating apparatus 20 are given the same reference numerals as in FIG. 2.

The fuel cell 50 is, in the embodiment shown, a fuel cell of a type known generally as a solid oxide fuel cell. The fuel cell 50 comprises an anode 52 and a cathode 54.

The compressor region 113 of the gas turbine engine 10 supplies compressed air to the cathode 54 via a recuperator 140 along a line 56. In the anode 52, the hydrogen in the fuel reacts with oxygen ions produced at the cathode 54 (as explained below) to produce water molecules and electrons creating an electric current. This is an exothermic reaction and the heat generated is transferred to the incoming compressed air in the line 56 in the recuperator 140. The output from the cathode 54 is passed along a line 58 (via the recuperator 140) to a combustor 160. If desired the combustor 160 can be the combustor 15 of the engine 10.

A fuel mixture (labelled FUEL in FIG. 4) is supplied to a supplementary compressor 62 which also received recirculated carbon dioxide from the carbon dioxide recirculating apparatus 20 (as explained below). The fuel mixture comprises fuel, hydrogen, carbon dioxide, carbon monoxide and hydrocarbons and is compressed by the supplementary compressor 62 and fed via a line 64 to the anode 52 of the fuel cell.

The oxygen in the compressed air in the cathode 54 is electrically charged to provide oxygen ions. The oxygen ions pass through/across the solid oxide electrolyte membrane in the fuel cell 50 between the cathode 54 and the anode 52, to react with the hydrogen in the anode 52 (as described above).

The exhaust products from the anode 52 are fed via a line 66 to the carbon dioxide extraction means 22. The carbon dioxide is extracted from the exhaust products and passed via the line 24 to the carbon dioxide compressor unit 26 to be recirculated, via the cooler 30, back to the supplementary compressor 62.

The remaining exhaust products entering the carbon dioxide extraction means are passed to the combustor 160 along a line 68 and fed back to the turbine arrangement 116 of the engine 10 along a line 70. This powers the turbine arrangement to the drive the compressor arrangement 113. The exhaust from the turbine arrangement 116 is exhausted to atmosphere via the exhaust nozzle 19, (labelled EXHAUST).

As an alternative, or in addition, as shown in broken lines, the recirculated carbon dioxide flowing along the line 28 could be fed via a line 128 to the compressor arrangement 113.

Figure 5:
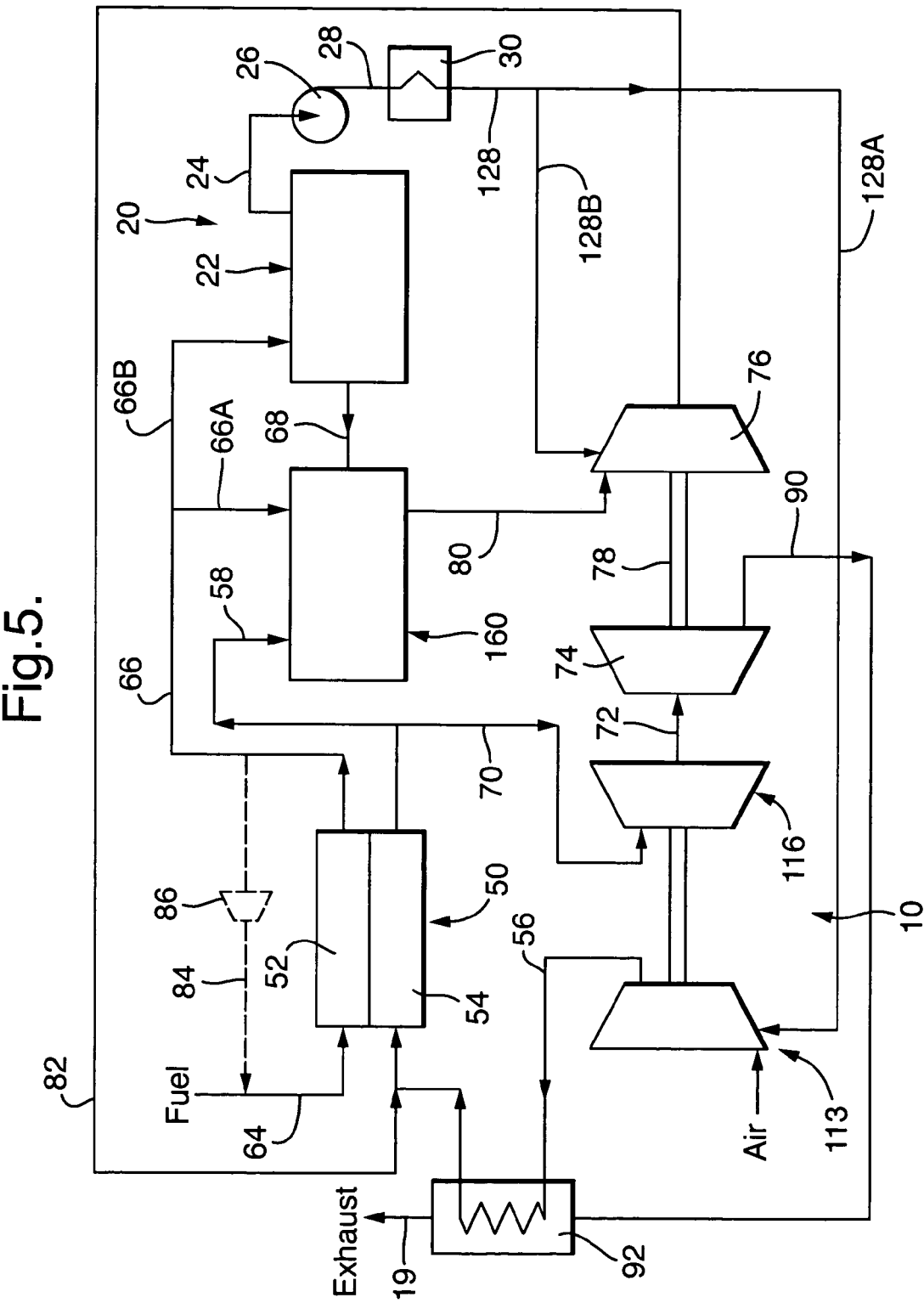
FIG. 5 is a diagrammatic representation of another embodiment of carbon dioxide recirculating apparatus incorporating a fuel cell.

Another embodiment of a carbon dioxide recirculating apparatus 20 incorporating a fuel cell 50 is shown in FIG. 5. The carbon dioxide recirculating apparatus 20 is shown in use in a gas turbine engine 10. The features of the gas turbine engine 10 and the carbon dioxide recirculating apparatus are given the same reference numerals as in FIG. 2.

The fuel cell 50 shown in FIG. 5 is of a type known as a molten carbonate fuel cell. In such a fuel cell 50 there is a requirement for carbon dioxide on the air/oxygen side of the fuel cell 50, i.e. the cathode 54.

The compressor region 113 receives recirculated carbon dioxide via line 128A (as explained below), in addition to air. The compressed air and carbon dioxide is passed via the line 56 to the cathode 54 of the fuel cell 50. Some of the reaction products from the cathode are passed via the line 58 to the combustor 160. In some embodiments, the combustor 160 could be the combustor 15 of the gas turbine engine 10.

The remainder of the reaction products from the cathode 54 are passed via a line 70 to the turbine arrangement 116, which drives the compressor arrangement 113 as explained above. The exhaust 72 from the turbine arrangement 116 drives a free power turbine 74, which, in turn, drives a further compressor 76 via a shaft 78.

The exhaust from the free power turbine 74 is passed via a line 90 to a heat exchanger or recuperator 92 where heat is exchanged with compressed gases exiting from the compressor arrangement 113 prior to entering the cathode 54.

After exiting the recuperator 92, the gases from the free power turbine 74 are exhausted to atmosphere via the exhaust nozzle 19.

The combustion products from the combustor 160 are passed via a line 80 to the further compressor 76. The further compressor 76 also receives recirculated carbon dioxide (as explained above) via a line 128B. The compressed combustion products and carbon dioxide are passed to the cathode 54 via a line 82.

The anode 52 receives fuel via the line 64. The reaction products pass from the anode 52 by a line 66. Some of the reaction products may be recirculated via a line 84 and a supplementary compressor 86 to be passed back into the anode 52.

The reaction products from the anode 52, which are not recirculated, are split into two. Some of the reaction products from the anode 52 are passed via a line 66A to the combustor 160 and are mixed with the incoming reaction products from the cathode 54 and combusted. The remainder of the reaction products from the anode 52 are passed via a line 66B to the carbon dioxide extraction means 22.

The carbon dioxide is extracted and passed via the line 24 to the carbon dioxide compressor unit 26 and then cooled by the cooler 30. The cooled carbon dioxide exits the cooler 30 via the line 128. Some of the cooled carbon dioxide is passed via the line 128A to the compressor arrangement 113. The remainder of the cooled carbon dioxide is passed via the line 128B to the compressor 76, as described above.

The remaining cathode reaction products in the carbon dioxide extraction means 22 are passed via the line 68 to the combustor 160 to be combusted.

The above described embodiments have the advantage that the fog sprayed into the compressor region is formed from liquid carbon dioxide that flashes under more favourable and more easily achieved conditions than water. As a result, a fog with a small droplet size is generated more readily than with water. This results in there being less demanding nozzle and spray pressure specifications than are necessary with water.

Further, the above described embodiments have the advantage that the use of carbon dioxide means that complete evaporation of the fog can be more easily achieved than with water, due to the high saturated vapour pressure of the carbon dioxide at ambient temperatures. This permits the use of carbon dioxide based fog cooling to be used in conditions that would be too confined in length to achieve adequate evaporation with a water based fog. A further benefit is that carbon dioxide recirculation is achieved with less compression in the recirculating system than with a water based recirculation. It is possible thus to enhance efficiency and power of the engine more substantially than with the use of water.

The use of carbon dioxide has the further advantage that cooling could be carried out at the inlet of the compressors of a gas turbine engine, and could also be used in other engines, for example reciprocating engines. Indeed, the invention could be applied to a wide range of cycles using heat engines and/or fuel cells as the primary source of carbon dioxide.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method of recirculating carbon dioxide from a flow of gas through a gas turbine engine comprising a compressor region upstream of a combustion means, a turbine region downstream of said combustion means and an exhaust nozzle downstream of said turbine region, the method comprising supplying air to the compressor region, supplying fuel to the combustion means, burning said fuel in the air in said combustion means to produce exhaust gases, extracting carbon dioxide from the exhaust gases from a first region downstream of the turbine region, supplying carbon dioxide depleted exhaust gases to the exhaust nozzle, condensing the extracted carbon dioxide and thereafter feeding the condensed carbon dioxide to a second region upstream of the combustion means without adding any constituent thereto, the second region comprising the compressor region.

2. A method according to claim 1, wherein the step of condensing the extracted carbon dioxide comprises providing heat removal means to remove heat from the carbon dioxide and compressing the carbon dioxide prior to removing said heat from the carbon dioxide.

3. A method according to claim 2, wherein the heat removal means comprises cooling means to cool the carbon dioxide to effect said condensation thereof.

4. A method according to claim 1, wherein the step of feeding the condensed carbon dioxide to the second region of the engine comprises spraying the condensed carbon dioxide to the second region to form a fog of the carbon dioxide in the second region.

5. A method according to claim 1, wherein the step of feeding the carbon dioxide to the second region of the arrangement comprises atomising the condensed carbon dioxide.

6. A method according to claim 1, wherein the compressor region comprises first and second compressors arranged in axial flow series in the path, and the step of feeding the carbon dioxide to the second region of the path comprises feeding the carbon dioxide to one or more of: the inlet of the compressor region; between the first and second compressors; and to the outlet of the compressor region.

7. A method according to claim 1, wherein the engine may comprise a heat exchanger to exchange heat between gas entering the combustion means and gas exhausted from the combustion means, and the step of feeding the condensed carbon dioxide to the second region comprises feeding the carbon dioxide to the outlet of the compressor region.

8. A method according to claim 7, wherein the compressor region comprises first and second compressors and the step of feeding the condensed carbon dioxide to the compressor region also includes feeding some of the condensed carbon dioxide between the first and second compressors and/or to the inlet of the compressor region.

* * * * *